Feb. 11, 1941.   J. A. MULLER ET AL   2,231,281
FEEDING DEVICE FOR MOLDING MACHINES
Filed Nov. 26, 1937
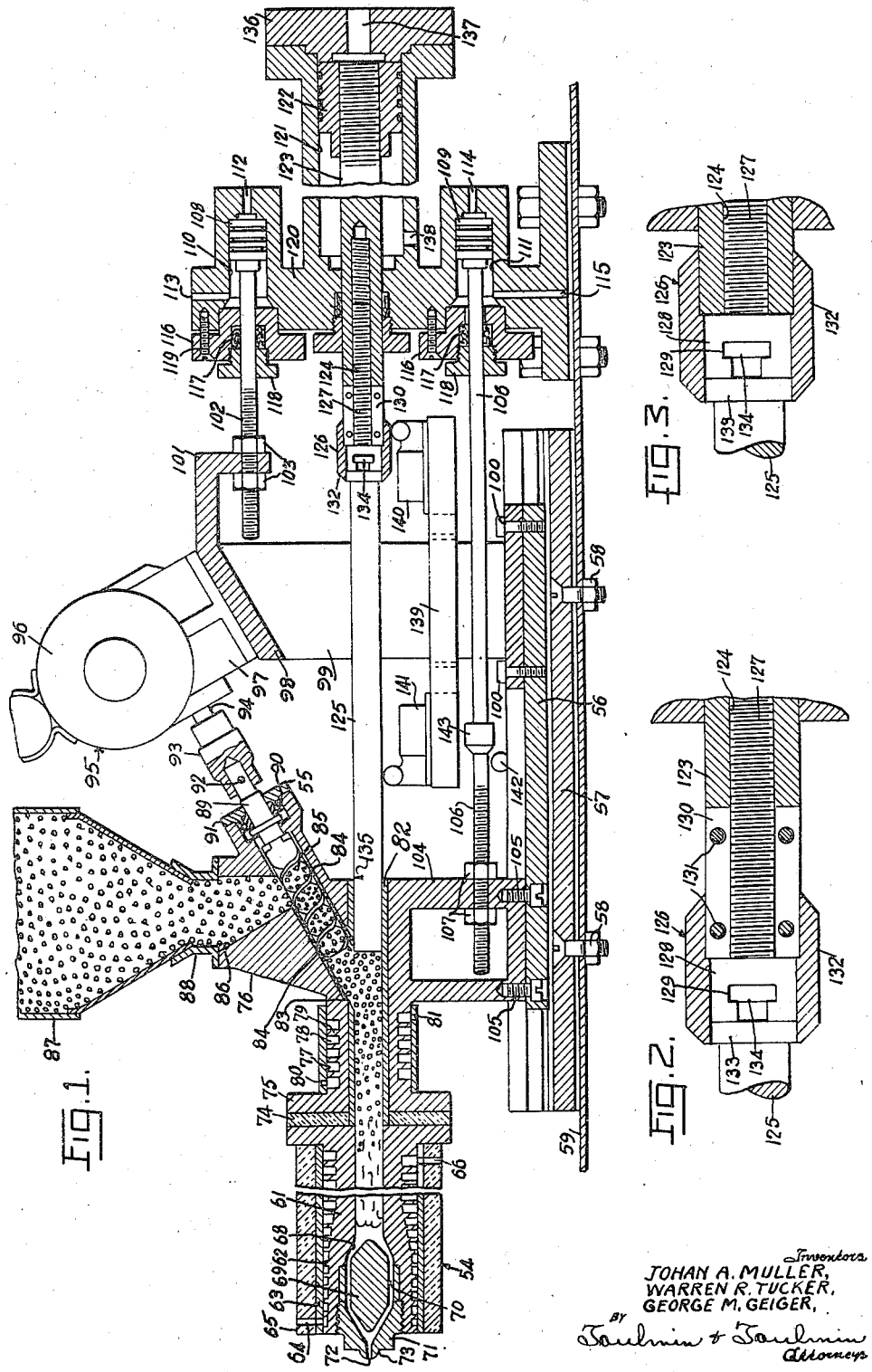
Inventors
JOHAN A. MULLER,
WARREN R. TUCKER,
GEORGE M. GEIGER,
BY
Toulmin & Toulmin
Attorneys

Patented Feb. 11, 1941

2,231,281

UNITED STATES PATENT OFFICE

2,231,281

FEEDING DEVICE FOR MOLDING MACHINES

Johan A. Muller, Mansfield, and Warren R. Tucker and George M. Geiger, Mount Gilead, Ohio, assignors to The Hydraulic Press Corp. Inc., Wilmington, Del., a corporation of Delaware Application November 26, 1937, Serial No. 176,504

3 Claims. (Cl. 287—62)

This invention relates to feeding devices, and in particular, to devices for supplying molding material to plastic extrusion molding presses.

An object is to provide an injector for molding material having an injector plunger with an expansible connection arranged between the injector plunger and the means for reciprocating this plunger, so as to permit the position of the injector to be changed for different sizes of dies by lengthening or shortening the plunger.

Another object is to provide an injector for molding material having a reciprocable injector plunger connected to an operating member by means of an adjusting screw, and a spacing sleeve permitting the effective length of the plunger to be adjusted for different sizes of dies.

The general organization of feeding mechanism disclosed herein forms no part of the present invention but is disclosed and claimed in the application of Muller and Tucker, Serial No. 142,674 filed May 14, 1937.

In the drawing:

Figure 1 is a central vertical section through the feeding device of this invention, showing the hydraulic plungers for advancing the feeding and injecting mechanism, and also for operating the injector plunger.

Figure 2 is an enlarged vertical section of a portion of Figure 1, showing the connecting device or adapter between the injector plunger and the injector piston rod, with an adapter spacer inserted therein.

Figure 3 is a view similar to Figure 2, but with the adapter spacer removed.

Referring to the drawing in detail, Figure 1 shows a feeding device together with the hydraulic devices for actuating the feeding and injector units. Each feeding and injector unit consists of an injector, generally designated 54, and a feeding device, generally designated 55. Each feeding and injector unit (Figure 1) is mounted upon a slide 56, which engages a guide plate 57 bolted, as at 58, to the plate 59, mounted upon a suitable base. The injector 54 consists of a central cylinder 61 having radiating fins 62 engaging an outer casing 63 so as to form a chamber therebetween for the circulation of a heating agent, such as heated oil. This oil enters by a passageway 64 in an insulating wall 65, and leaves by a similar passageway 66 (Figure 1). The injector cylinder 61 contains a bore 67 with an enlargement 68 containing a spindle-shaped deflector 69, having passages 70 for the passage of the plastic material.

Beyond the enlargement 68 and the deflector 69 is a nozzle 71 having an orifice 72 in a rounded tip 73. The injector cylinder 61 is spaced by means of an insulation disc 74 from a flanged portion 75 of the feed casing 76. The latter is surrounded by a cylindrical wall 77, thereby providing a chamber 78, subdivided by annular fins 79 and having ports 80 and 81 for the admission and discharge of a cooling fluid. The purpose of this cooling fluid is to prevent the premature softening of the molding material before it reaches the injector chamber 67, thereby preventing the clogging of the feeding mechanism.

Within the feed casing is a sleeve 82 having an aperture 83 communicating with an inclined feed bore 84, with a rotary feed screw 85 therein. A conical throat 86 admits molding material, in the form of small particles, to the feed bore 84 from the feed hopper 87, supported in the holder 88.

The feed screw 85 is connected to a shaft 89 mounted on anti-friction bearings 90, held in place by the retaining plate 91. The shaft 89 is connected by the pin 92 to the coupling 93 on the output shaft 94 of the geared motor unit, generally designated 95. The latter consists of a motor 96 connected to a reduction gear box 97, by which the speed of the motor is reduced to the slow speed necessary for operating the feed screw 85. The geared motor unit 95 is mounted upon a support 98, with a post 99 secured to the slide 56 by the bolts 100.

The support 98 is provided with an angled portion 101, to which the piston rod 102 is secured by means of the nuts 103 threaded thereon. Similarly, the feed casing 76 has a downwardly extending post 104, bolted as at 105, to the slide 56 and connected to the piston rod 106 by the nuts 107 threaded on the end thereof. The piston rods 102 and 106 terminate in piston heads 108 and 109, respectively, reciprocable in cylinder bores 110 and 111. At their opposite ends these cylinder bores are provided with passages 112 and 113, also 114 and 115, respectively, (Figure 1). Surrounding the piston rods 102 and 106 are the closure plates 116, having packings 117 compressed by glands 118 for the prevention of leakage. The closure plates 116 are bolted, as at 119, to the cylinder blocks 120 containing the cylinder bores 110 and 111. The cylinder block 120 also contains an injector cylinder bore 121, with a piston head 122 mounted on a piston rod 123, the opposite end of which is provided with a threaded bore 124.

The piston rod 123 is connected to the injector plunger 125 by a coupling, generally designated 126. This coupling is arranged to permit the distance between the injector plunger 125 and the piston rod 123 to be lengthened or shortened, according to the size of the dies which the device may be used to feed. For this purpose an adapter screw 127 (Figures 2 and 3) is threaded into the threaded bore 124, and is provided with a head 128 with a T-slot 129. Between the end of the piston rod 123 and the slotted head 128 is placed a split ring 130, the halves of which are held together by the cap screws 131. Surrounding the slotted head 128 and the split ring 130 is a collar 132 for additionally retaining the various portions and holding them together. The injector plunger 125 is provided with a flanged enlargement 133, with a T-shaped projection 134 fitting into the slot 129. In order to make use of this coupling device 126, the injector plunger 125 is provided with an index marker 135, which exactly registers with the outer end of the sleeve 82 when the injector plunger 125 is in its retracted position at the outer edge of the aperture 83.

If the dies which the device feeds are now increased in size, the nuts 103 and 107 are loosened on the piston rods 102 and 106, and the feeding assembly slid back to the proper distance to accommodate the tip 73 of the nozzle 71 to the increased size of die. The injector plunger 125 is now uncoupled from the piston rod 123 and readjusted so that the index marker 135 again comes exactly at the outer end of the sleeve 82, the split ring 130 being removed by removing the cap screws 131. The split ring 130 is then replaced by a shorter split ring, and the assembly clamped together again in the manner shown in Figure 2. By supplying split rings 130 in various lengths, the apparatus can be adapted to dies of varying sizes. When the split ring 130 is entirely removed and the coupling 126 reassembled, the apparatus is adjusted for the maximum permissible size of die, and its appearance is then as shown in Figure 3. The cylinder bore 121 for the injector piston head 122 is closed by an end plate 136, with a port 137 therein. The opposite end of the cylinder bore 121 is provided with a port 138.

Mounted on the post 99 is a supporting plate 139, upon which a pair of limit switches 140 and 141 is adjustably mounted and adapted to be operated by engagement with the collar 132. Similarly, the slide 56 carries a limit switch 142, adjustably mounted thereon and adapted to be engaged by a collar 143 on the piston rod 106. The limit switches 140 and 141 control the action of the geared motor unit 95 for operating the feed screw 85. The limit switch 142, however, controls the energization of solenoids connected to valve rods for shifting the injector operating valves.

In the operation of the device, pressure fluid is supplied to the cylinder bores 110, 111, causing the pistons 108 and 109 thereof to move inwardly, thereby shifting the feeding and injector unit into engagement with the die which the device is to feed. As the piston rod 106 pushes the feeding and injector unit into engagement with this die (not shown) the collar 143 engages and closes the limit switch 142 (Figure 1), thereby energizing the electrical devices which supply pressure fluid to the injector cylinder bore 121. This causes the pistons 122 to move the injector plungers 125 inward and execute an injection stroke.

The plastic material, which has been heated in the injector chamber 67, is then pushed past the deflector 69 and through the orifice 72 into the cavities of the die. The limit switches 140 and 141 come into play at this point to operate the geared motor unit 95 so as to cause the feed screw 85 to rotate and feed more of the particles of molding material from the feed chamber 84 into the injector chamber 67. These limit switches 140 and 141 are connected to an electrical circuit, forming no part of the present invention, but disclosed and claimed in the copending application of Ernst and Lawyer, Ser. No. 138,904, filed April 26, 1937.

By the operation of these limit switches 140 and 141 the feed screw 85 is caused to feed a slight excess of material into the injector chamber 67 so that an adequate amount of material is always present in the chamber. As a surplus amount of material collects therein the injector plunger 125 is incapable of executing a complete injection stroke, hence, the collar 132 is temporarily incapable of engaging and actuating the limit switch 141. The electrical circuit then remains deenergized, and the feed screw 85 remains inactive and skips a cycle while the injector plunger 125 executes another injection stroke and clears the injector chamber 67 of the surplus material.

After the material has been allowed to cool in the die for a sufficient length of time the injector operating valves are shifted by the operator so that pressure fluid enters the port 138 in the injector operating cylinder bore 121, thereby returning the injector operating piston 122 to its starting position. Pressure fluid is then admitted into the passages 113 and 115 at the ends of the cylinder bores 110 and 111, causing the pistons 108 and 109 to shift the feeding and injector unit out of engagement with the die. The feeding and injector unit thereby returns to its starting position, ready for the execution of another feeding and injection cycle.

It will be understood that we desire to comprehend within this invention such modifications as come within the scope of the claims and the invention.

Having thus fully described our invention, what we claim as new and desire to secure by Letters Patent, is:

1. In a device for adjustably coupling two movable members, an adjusting screw threadedly engaging one of said members and having a head with a T slot, the other member having a T projection fitting into said T slot, and a spacing sleeve surrounding said adjusting screw and disposed between said screw head and said threadedly engaged member.

2. In a device for adjustably coupling two movable members, an adjusting screw threadedly engaging one of said members and having a head with a T slot, the other member having a T projection fitting into said T slot, a split spacing sleeve surrounding said adjusting screw and disposed between said screw head and said threadedly engaged member, and means for clamping the split portions of said sleeve together.

3. In a device for adjustably coupling two movable members, an adjusting screw threadedly engaging one of said members and having a head with a T slot, the other member having at one end a T projection fitting into said T slot, a split spacing sleeve surrounding said adjusting screw and disposed between said screw head and said threadedly engaged member for adjustably positioning one of said members relatively to the other member, and a retaining element surrounding said T projection and said screw head.

JOHAN A. MULLER.
WARREN R. TUCKER.
GEORGE M. GEIGER.